United States Patent [19]

Bruno et al.

[11] Patent Number: 5,131,782

[45] Date of Patent: Jul. 21, 1992

[54] SHAFT COUPLING FOR GAS TURBINE ENGINE

[75] Inventors: Vittorio Bruno; Edwin C. Tetsull, both of Mississauga, Canada

[73] Assignee: Pratt & Whitney Canada, Inc., Longueuil, Canada

[21] Appl. No.: 568,377

[22] Filed: Aug. 15, 1990

Related U.S. Application Data

[63] Continuation-in-part of Ser. No. 249,801, Sep. 27, 1988, abandoned.

[51] Int. Cl.$^5$ .................................. F16B 7/02
[52] U.S. Cl. ..................................... 403/259; 403/317; 403/359; 403/370
[58] Field of Search .................. 403/7, 19-20, 403/22, 15, 37, 258-259, 261, 263, 316-317, 320, 334, 359, 370; 285/94, 330, 332, 354

[56] References Cited

U.S. PATENT DOCUMENTS

| | | | |
|---|---|---|---|
| 2,317,070 | 4/1943 | Le Tourneau | 403/259 X |
| 3,900,270 | 8/1975 | Rhodes | 403/317 |
| 4,011,019 | 3/1977 | McDonald et al. | 403/15 |
| 4,375,926 | 3/1983 | Feller | 403/15 |
| 4,396,310 | 8/1983 | Mullenberg | 403/370 X |
| 4,525,916 | 7/1985 | Wuhrer | 403/15 X |
| 4,711,594 | 12/1987 | Agee | 403/263 |
| 4,767,230 | 8/1988 | Leas, Jr. | 403/259 X |
| 4,826,347 | 5/1989 | Baril et al. | 403/282 |
| 4,974,989 | 12/1990 | Salter | 403/334 X |

FOREIGN PATENT DOCUMENTS

2905572  8/1980  Fed. Rep. of Germany ........ 403/37

Primary Examiner—Peter M. Cuomo

[57] ABSTRACT

A small gas turbine engine including a power turbine shaft and a gearbox input shaft co-axially aligned one with the other and mounted in three bearings. The power turbine shaft is provided with a male conical surface while the gearbox input shaft is hollow and includes a female conical surface adapted to mate with the male conical surface of the power turbine shaft. The power turbine shaft also includes an axial projection being threaded and inserted within the hollow portion of the gearbox input shaft. A nut having a shoulder is threaded onto the threaded projection of the power turbine shaft and engages a shoulder provided within the hollow gearbox input shaft such that torsion applied to the nut will force axial engagement of the conical surfaces. A complementary spline section may be provided, on the one hand, between the nut engaging shoulder and the female conical section on the gearbox input shaft. The complete coupling is within the diameter of the two co-axial shafts.

3 Claims, 1 Drawing Sheet

SHAFT COUPLING FOR GAS TURBINE ENGINE

This application is a continuation-in-part of application Ser. No. 07/249,801 filed on Sep. 27, 1988, now abandoned.

BACKGROUND OF THE INVENTION

1. Field of the Invention

The present invention relates to an arrangement for coupling two co-axial shaft members, and more particularly, to provide an improved tapered coupling for transferring torsional forces and to provide improved stiffening of the shaft in the area of the coupling.

2. Description of the Prior Art

Gas turbine engines, especially small turbine engines, are often used for providing mechanical energy through a transmission or gearbox. The shaft of such an engine is designed to rotate at very high r.p.m.'s which may be in the order of 40,000 r.p.m. or higher.

It is necessary to couple the turbine engine shaft to a gearbox input pinion, and in view of the magnitude of the velocity, threaded or splined coupling arrangements tend to allow too great tolerances due possibly to a phenomenon referred to as "hoop stress" which is generated by the high centrifugal force. The result is reduced stiffness of the joint or coupling, and in the case of a threaded joint, a less efficient transfer of torsional forces.

Various attempts have been made in order to overcome the problems mentioned above as being inherent in shaft couplings in small turbine engines. West German Offenlegungsschrift 24 45 041, published Apr. 17, 1975 to Rolls Royce, suggests a shaft coupling including an axial splined section and tapered or conical rings engaging tapered sections of one of the shafts on either side of the splined section. The conical rings are secured by threaded sleeves. U.S. Pat. No. 3,718,957, issued Mar. 6, 1973 to W. C. Shank, shows an impeller hub secured by a tapered ring and a threaded nut. West German Auslegeschrift 27 47 319, published Apr. 5, 1979, shows another example of a shaft coupling using a conical ring with a threaded nut for coupling a shaft in small turbine engines. All of the above patents are concerned with preventing the axial displacement of the shafts being coupled.

SUMMARY OF THE INVENTION

It is an aim of the present invention to provide an improved shaft coupling for small turbine engines over the couplings of the prior art, and in particular, a coupling which is stiffer than prior art couplings.

It is a further aim of the present invention to provide a shaft coupling which is more suitable at the high r.p.m.'s and restricted shaft diameters encountered in small turbine engines.

A construction in accordance with the present invention comprises a shaft coupling, particularly for a small gas turbine engine, having first and second axially aligned shafts. The first shaft, which is hollow, includes a female conical coupling surface defined at the end thereof, and the second shaft includes a male conical coupling surface at the end thereof adapted to engage the female conical surface of the first shaft. Means are provided for axially retaining the first and second shafts together.

In a more specific embodiment, the means for axially retaining the shafts together include a small diameter exteriorly threaded axial projection on the end of the second shaft and a threaded nut having a shoulder portion of a given diameter. The internal surface of the first hollow shaft includes a shoulder of a diameter less than the diameter of the shoulder on the nut such that the nut, when engaged on the threaded projection of the second shaft, abuts the shoulder on the internal surface of the first shaft.

In a still further embodiment of the present invention, complementary axial splines are provided on the extension surface of the second shaft between the threaded projection and the conical section and on the internal surface of the first shaft between the shoulder and the conical section thereof.

In a still further embodiment of the present invention, the cone angle of the taper portion is approximately 8° with respect to the axes of the respective shafts.

The advantages that flow from such a coupling construction are that the coupling is much stiffer. This is important in a small turbine engine construction wherein fewer shaft bearings are used. Furthermore, the diameter of the coupled shafts is maintained at a minimum compared to the prior art couplings, thereby providing improved dynamic characteristics.

BRIEF DESCRIPTION OF THE DRAWINGS

Having thus generally described the nature of the invention, reference will now be made to the accompanying drawings, showing by way of illustration, a preferred embodiment thereof, and in which.

DESCRIPTION OF THE PREFERRED EMBODIMENTS

Figure 1:
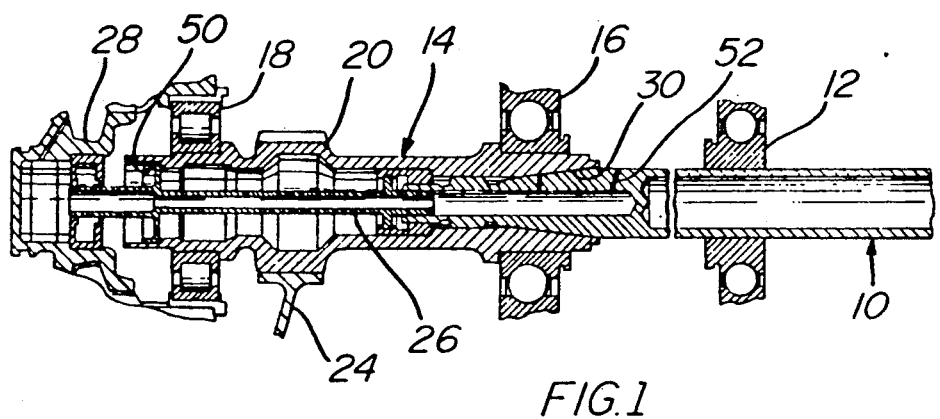
FIG. 1 is a fragmentary axial cross-section of a turbine engine shaft coupling.
Figure 2:
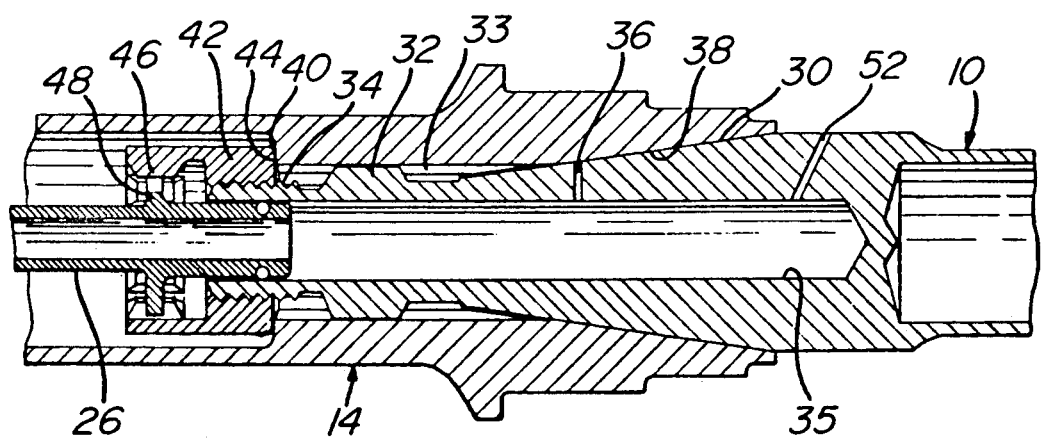
FIG. 2 is an enlarged fragmentary axial cross-section of the coupling shown in FIG. 1.

Referring now to the drawings, a power turbine shaft 10 of a typical small gas turbine engine is shown, mounted in a bearing 12. The gearbox input shaft 14 is rotatably mounted in bearings 16 and 18. In FIG. 1, the bearing 18 is shown mounted in the casing 28. Of course, bearings 12 and 16 would likewise be mounted.

On the outer surface of the shaft 14 is a drive gear 20 adapted to engage a gear 24 of the gearbox. The shaft 14 is hollow, as shown in the drawings, and a removable oil conduit 26 can be slid axially within the hollow shaft.

Shaft 10 has a conical end section 30, a splined section 32, and an axial threaded projection 34. An oil vent 36 is provided from the hollow oil conduit interior 35 of shaft 10 leading to the conical surface 30.

The shaft 14 includes a conical surface 38 adapted to mate with the conical surface 30 of shaft 10. The angle of the conical surfaces 30 and 38 is chosen at 8° to the axis of the shafts. This angle has been found to be a suitable compromise to provide maximum shaft stiffness at the coupling while allowing reasonable separation of the two shafts 10 and 12. If the angle of the conical surfaces was shallower, the stiffness would increase, but, of course, the ability to separate the shafts would become more restricted. Separation of the shafts can be rendered more feasible by providing oil under pressure through the conduit 36 to the surface between conical surfaces 30 and 38.

The shaft 14, in operation, may be subjected to 40,000 or more rpm which provides significant centrifugal forces. It has been found that the female conical surface 38 formed in the shaft 14 will tend to expand slightly under such centrifugal forces. A loose joint may result between shaft 10 and shaft 14, that is, at the joint formed at surfaces 30 and 38 respectively. If the tolerances are adjusted such that the male conical surface 30 is slightly steeper than the angle of the female conical surface 38 of the shaft 14, it will then match with the slightly steeper angle of the conical surface 30 when expanded. In fact, the female conical surface 38 and the surrounding material of the shaft 14 may be prestressed by forcing a complete contact of the surfaces 30 and 38 through the action of the nut 42, given the steeper angle of the conical surface 30. Thus, because of the prestressing, the female conical surface 38 of the shaft 14 will not expand further at high centrifugal forces, and a tight joint will be preserved.

In experiments, it has been found that the angle of the male conical surface 30 should be steeper than the angle of the female conical surface 38 by an amount not exceeding 2 minutes.

The splines 32 mate with corresponding splines 33 on the interior of shaft 14. Although the torque transmission between shafts 10 and 14 is believed to be sufficient by means of the conical joint, the splines 32 and 33 are provided in the event that the torque transmission was not sufficient at the conical joint.

The shafts are retained axially by means of a nut 42 having threads adapted to engage threaded section 34 of the shaft 10. The nut 42 has a shoulder 44 having a diameter which is greater than abutting shoulder 40 provided on the internal surface of the shaft 14. Access to the nut 42 is provided by the hollow shaft 14. The nut 42 has an annular sleeve extending axially from shoulder 44 within the internal bore of the shaft 14 away from the shoulder 44. The sleeve is provided with splined teeth 46. Splined teeth may be provided on the oil conduit 26 engaging internal splined teeth 46 on the nut 42. The oil conduit 26 can be utilized as a wrench extension for removing or inserting the nut 42 onto the threaded portion 34 of shaft 10. Alternatively, a special wrench tool can be used for mounting the nut. The oil conduit 26 can also be utilized to provide locking for nut 42, by means of having a suitable spline engagement at 50 between the oil conduit 26 and shaft 14. It may be useful to mention this second function of the oil conduit. There is also a third function, namely, providing oil for lubricating the bearings via a separate conduit 52 through shaft 10.

By rotating and tightening the nut 42 on the threaded portion 34, the shaft 14 is displaced axially in tighter contact at the conical joint formed by conical surfaces 30 and 38 respectively of shafts 10 and 14.

The resulting coupling provides increased stiffness of the shaft coupling which is beneficial in a small turbine engine where fewer bearings are used. In this case, a three bearing arrangement is used for the gearbox input shaft and the end of the power turbine shaft.

The coupling mechanism is completely confined within the diameter of the shafts such as to avoid enlarged coupling diameters and thereby improve the dynamic characteristics of the coupling.

We claim:

1. A coaxial shaft coupling for small gas turbine engines comprising first and second axially aligned shafts with at least the first shaft being an elongated hollow shaft defining an axial opening at one and a female conical coupling surface at the other end thereof communicating with the axial opening at said one end by means of an internal bore defined by the hollow first shaft, the internal bore having a shoulder, the second shaft including a male conical coupling surface at a first end of the second shaft for engaging in a complementary manner said female conical coupling surface of the first shaft, the second shaft including a threaded axial projection extending axially from the first end thereof, a nut for threadably engaging the threaded axial projection of the second shaft, said nut for threadably engaging the threaded axial projection of the second shaft having a diameter less than the internal bore but greater than said shoulder so that the second shaft is retained axially by said nut within the first shaft, the improvement comprising:
a first axial conduit for lubricant defined in the second shaft in communication at said first end thereof with the internal bore of the first shaft when the first and second shafts are engaged and second lubricant conduit extending from the first axial conduit in the second shaft to an outer surface of the second shaft,
a separate oil conduit sleeve extending axially through the internal bore of the first shaft and beyond the axial opening thereof and removably engageable within the first axial conduit defined in said second shaft.
the separate oil conduit sleeve communicating with a supply of lubricant which is passed through said first shaft through said male and female conical coupling surfaces and to the second shaft, such that the lubricant is fed to selected locations at the outer surface of the second shaft,
wherein the nut includes an annular axial projection defining a nut sleeve extending within the internal bore of the first shaft when the nut is engaged on the threaded axial projection of the second shaft, the nut sleeve having a first plurality of axially extending splined teeth or an interior surface thereof for engaging a second plurality of axially extending splined teeth provided on an exterior surface of the separate oil conduit sleeve, whereby the separate oil conduit sleeve serves as a tool for tightening and releasing the nut from the threaded axial projection.

2. A coaxial shaft coupling as defined in claim 1, wherein the internal bore of the first shaft includes a third plurality of axially extending splined teeth adjacent the male and female conical coupling surfaces for engaging a fourth plurality of axially extending splined teeth on said threaded axial projection of said second shaft, such that, when said second plurality of splined teeth engage the first plurality of splined teeth of the nut and the fourth plurality of splined teeth engage the third plurality of splined teeth on the internal bore of the first shaft, the nut is positively locked.

3. A coaxial shaft coupling as defined in claim 1, wherein the angle of a conical section defined by the male conical coupling surface of the second shaft is greater than the angle of a conical section defined by female conical coupling surface of the first shaft by a value of up to 2 minutes.

* * * * *

UNITED STATES PATENT AND TRADEMARK OFFICE
CERTIFICATE OF CORRECTION

PATENT NO. : 5,131,782

DATED : July 30, 1992

INVENTOR(S) : Vittorio Bruno, Edwin C. Tetsull

It is certified that error appears in the above-identified patent and that said Letters Patent is hereby corrected as shown below:

On the Title page, item [57]
In the Abstract, col. 2,

Line 16, after ", between" insert --the projection and the male conical surface on the power turbine shaft and, on the other hand, between--

Signed and Sealed this

Twenty-eighth Day of September, 1993

Attest:

BRUCE LEHMAN

Attesting Officer

Commissioner of Patents and Trademarks